United States Patent [19]

Amey

[11] Patent Number: 5,125,929

[45] Date of Patent: Jun. 30, 1992

[54] FLUORESCENT PAPER STRENGTH ENHANCING RESIN

[75] Inventor: Ronald L. Amey, Wilmington, Del.

[73] Assignee: E. I. Du Pont de Nemours and Company, Wilmington, Del.

[21] Appl. No.: 621,334

[22] Filed: Nov. 29, 1990

[51] Int. Cl.⁵ .................... C09B 62/54; C09B 69/10; D21H 21/30
[52] U.S. Cl. .......................... 8/544; 8/647; 8/648; 8/919; 162/162; 162/164.6; 162/168.2; 106/287.28; 525/540
[58] Field of Search ............. 8/544, 647, 648, 919; 162/162, 164.6, 168.2; 106/287.28; 525/540

[56] References Cited

U.S. PATENT DOCUMENTS

| | | | |
|---|---|---|---|
| 3,139,438 | 6/1964 | Booth et al. | 8/544 |
| 3,144,380 | 8/1964 | Drennen | 162/162 |
| 4,718,918 | 1/1988 | Heller et al. | 8/648 |

FOREIGN PATENT DOCUMENTS 2094298  9/1982  United Kingdom .................. 8/544

Primary Examiner—Paul Lieberman
Assistant Examiner—Bradley A. Swope
Attorney, Agent, or Firm—Earl L. Handley

[57] ABSTRACT

A fluorescent resin suitable for use as a paper strength enhancing additive having the formula:

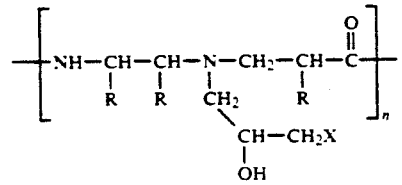

where each R is independently selected from the class consisting of methyl and hydrogen, X is a halogen selected from the group consisting of Cl, Br and I, and n is the integer 8 or a larger integer.

5 Claims, No Drawings

FLUORESCENT PAPER STRENGTH ENHANCING RESIN

FIELD OF THE INVENTION

This invention relates to a paper strength enhancing resin that is fluorescent.

BACKGROUND OF THE INVENTION

The addition of an amine across an activated aliphatic double bond is often called the Michael addition reaction, and this reaction can produce linear aminoacids or linear aminoesters. This reaction is shown in British Patent 1,256,804, U.S. Pat. No. 3,445,551 and U.S. Pat. No. 4,517,122. In the *Bull. Chem. Soc. Jap.* vol. 41, 1968, pages 256 to 259 it is reported that a linear aminoester had a molecular weight of 1000 and had a greenish yellow fluorescence. Japanese Patent No. SHO 44 [1969] 27907 reports that copolymers of linear aminoacids (containing polymerization control agents) with amines are subsequently reacted with epihalohydrin to produce a polymer resin that is useful to enhance the strength of both dry and wet paper.

SUMMARY OF THE INVENTION

This invention is a fluorescent resin having the formula:

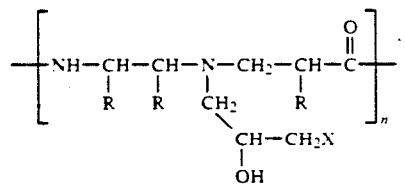

where each R is independently selected from the group consisting of methyl and hydrogen. X is a halogen selected from the group consisting of Cl, Br and I, and n is the integer 8 or a larger integer. Because the greatest known utility for these polymers is a strength enhancer for paper, n must be an integer small enough that the resin is water soluble; thus n should be smaller than about 50. The fluorescent property of the resin makes it particularly attractive as a paper additive in that it brightens and appears to whiten the paper, while common resins added to paper tend to yellow the paper and require the addition of brighteners and/or bleaches to bring them to the brightness level that is often desired.

DETAILED DESCRIPTION

In order to produce the resin of the invention certain important process parameters must be observed. The polymerization of the Michael addition product must be controlled such that the temperature does not exceed 165° C. A suitable range is 135° to 165° C. and it is preferable to operate at a temperature greater than 145° C. At temperatures above 165° C., the resin prepared is not fluorescent. The pressure should be 50 to 200 mm of Hg vacuum in order to achieve the molecular weight necessary to be useful as a paper strength enhancing agent—a weight average molecular weight of at least 1200. The reaction of this polymer with epihalohydrin to form the polymer of the invention should be carried out at a temperature in the range of 60° to 80° C. The amount of epihalohydrin employed should be about stoichiometrically equivalent to the number of =NH groups in the polymer, that is, the ratio of epihalohydrin to =NH should be in the range of about 0.8-1.5/1. Preferably, the epihalohydrin is added in a slight excess over the number of secondary amine groups, that is, in a mole ratio of 1.2-1.4 moles per mole of secondary amine groups.

After reaction of the epihalohydrin, in order to complete the paper strength enhancing composition, the pH is adjusted to 3-5, preferably 4-4.5 by the addition of an inorganic acid such as sulfuric acid, and the concentration of the resin adjusted so that the amount of resin is about 10 to 35% by weight of the aqueous mixture, preferably 25-35%.

The fluorescent resin may be added to paper pulp during manufacture of paper at levels of 0.5 to 1.0 wt. % based on the wt of the pulp. The resin may also be coated on the surface of the paper with a size press. The resin is cured in the standard fashion, typically in the dryer section of the paper machine.

The use of the resin of the invention allows paper to be fluorescently tagged, making it easier to inventory, track and control paper in commerce.

Suitable amines useful in the preparation of the Michael addition products have the formula:

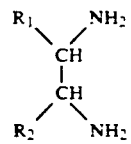

where $R_1$ and $R_2$ are independently selected from H, $CH_3$.

Suitable compounds having an activated aliphatic double bond useful in the preparation of the Michael addition products have the formula:

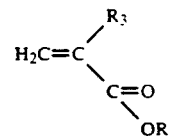

where R is selected from $CH_3$, $C_2H_5$, $C_3H_7$, and $C_4H_9$ and $R_3$ is selected from H, $CH_3$.

Suitable epihalohydrins useful in forming the polymers of the invention are epichlorohydrin, epibromohydrin and epiiodohydrin.

The Michael addition reaction can be carried out in a solvent such as tetrahydrofuran, or in the absence of a solvent.

TEST PROCEDURE FOR WET AND DRY STRENGTH

An aqueous solution of 1.0% resin is applied by size press application to bleached kraft paper and then dried. 4 inch × 1 inch specimens of treated paper were re-wetted in distilled water by soaking 1 hr, lightly blotted to absorb excess water and then tested in a tensile strength instrument. Wet strength is reported in pounds required to break the test sample per inch of sample width. Dry strength is similarly measured for a treated sample that has not been re-wetted. A wet-to-dry strength ratio is also reported as percent.

FLUORESCENCE SPECTROSCOPY

Fluorescence emission spectra of solution samples and treated paper samples are reported as emission maxima for 300 nm excitation with relative intensities scaled vs. a zero standard.

MOLECULAR WEIGHT DETERMINATION

Molecular weights were determined in cresol by gel-permeation chromatography using nylon-6,6 molecular weight standards for comparison. $\overline{M}_n$ = number average molecular weight. $\overline{M}_w$ = weight average molecular weight, and D means dispersity and is the ratio $\overline{M}_w\overline{M}_n$.

EXAMPLES

EXAMPLE 1

34.4 g of methyl acrylate is slowly added to stirred ethylenediamine (24.0 g), keeping T<45° C. by adjusting the addition rate. Product was 56.6 g (96.8%) of linear monomer (by IR and GC-MS) which contained minor amounts of bis-adduct.

43.9 g of this monomer was heated neat to >135° C., using a water aspirator and simple still head to remove methanol formed by the polymerization. The pot thermometer broke during the run so that the final run temperature is not known. (Because the thermometer broke and the final temperature is unknown, this portion of this example was later repeated as follows:

43.9 g of the monomer was stirred under $N_2$. Water aspirator vacuum was applied. Monomer was heated 15 minutes at 150° C., 70–80 mm Hg and 30 minutes at 160° C., 70–80 mm Hg. 11.2 g of distillate were collected during polymerization from the simple still. Polymer was cooled to 100° C., 80 ml of water added and the mixture stirred at 50° C. until dissolution was complete. 106.8 g of 25% solids polymer solution was obtained. $\overline{M}_n = 1100$, $\overline{M}_w = 1300$, D = 1.2.)

Viscous polymer was cooled to <100° C. and 80 ml deionized water added to dissolve the product. 6.7 g of distillate were collected and 91.7 g of a 30.3% solids polymer solution was recovered. The polymer had the following properties.

$\overline{M}_n = 1000$, $\overline{M}_w = 1220$, D = 1.22.

Fluorescence emission data: Polyamide solution
$\lambda$max = 400–410 nm (blue, 300 nm excitation),
Intensity = 40,000 (vs. 0 for standard).

50 g of this product (30.3% solids; 0.133 mole of secondary amine groups) was mixed with 50 g of deionized water and stirred under $N_2$ at 40° C. 13.9 g of epichlorohydrin (0.14 mole) was dripped in over 15 minutes and then the mixture was heated 1 hr at 75° C. The solution was cooled to room temperature and the pH adjusted from 6.5 to 4.6 with 0.4 ml concentrated $H_2SO_4$. 42.9 g of a 25.5% solids solution of the resin was obtained. $\overline{M}_n = 1580$; $\overline{M}_w = 2410$; D = 1.53

Fluorescent emission was virtually identical to that of the polyamide.

TABLE 1

| COMPARATIVE STRENGTH DATA | | | |
|---|---|---|---|
| | lbs/in Av. Wet | lbs/in Av. Dry | % Wet/Dry |
| Resin of this Example | 8.6 | 45.2 | 19 |
| Commercial polyamide-epichlorohydrin resin | 13.0 | 48.4 | 27 |

TABLE 2

| COMPARATIVE FLUORESCENCE DATA For bleached kraft paper. 300 nm excitation. Emission wavelength listed. | | |
|---|---|---|
| | $\lambda$ max., nm | Relative Intensity |
| Resin of this Example | 400–410 (tails to green) | 32000 |
| Commercial resin | 340*-due to polyamide absorption | 16000 |
| Control, No resin | No Emission | 0 |

*Not a visible emission, also observed in the resin of this Example

EXAMPLE 2

Michael addition reaction was carried out in the manner similar to that described in example 1 using ethylenediamine and methyl methacrylate followed by polymerization. The resulting fluorescent polymer gave an emission maximum (300 nm excitation) of 530 nm (green).

EXAMPLE 3

A Michael addition reaction was carried out in a manner similar to that described in example 1 using 1,2-propanediamine and methyl acrylate followed by polymerization. The resulting fluorescent polymer gave an emission maximum (300 nm excitation) of 545 nm (yellow).

I claim:

1. A fluorescent resin having the formula:

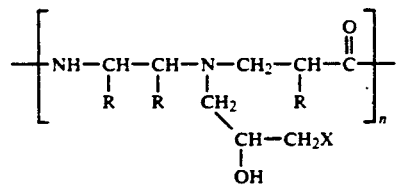

where each R is independently selected from the group consisting of methyl and hydrogen, X is a halogen selected from the group consisting of Cl, Br and I, and n is the integer 8 or a larger integer.

2. The resin of claim 1 in which each R group is hydrogen, and the resin has a blue-white fluorescence.

3. An aqueous coating solution containing the resin of claim 1.

4. A strength enhanced paper impregnated with the fluorescent resin of claim 1.

5. The resin of claim 1 where n is the integer 8 or a larger integer but smaller than about 50.

* * * * *